United States Patent
Choi et al.

(10) Patent No.: US 12,100,891 B2
(45) Date of Patent: Sep. 24, 2024

(54) ANTENNA MODULE AND DISPLAY DEVICE INCLUDING THE SAME

(71) Applicant: DONGWOO FINE-CHEM CO., LTD., Jeollabuk-do (KR)

(72) Inventors: Byung Jin Choi, Incheon (KR); Hee Jun Park, Gyeonggi-do (KR); Jae Hyun Lee, Gyeonggi-do (KR)

(73) Assignee: DONGWOO FINE-CHEM CO., LTD., Jeollabuk-do (KR)

( * ) Notice: Subject to any disclaimer, the term of this patent is extended or adjusted under 35 U.S.C. 154(b) by 268 days.

(21) Appl. No.: 17/736,164

(22) Filed: May 4, 2022

(65) Prior Publication Data

US 2022/0263237 A1    Aug. 18, 2022

Related U.S. Application Data

(63) Continuation of application No. PCT/KR2020/015483, filed on Nov. 6, 2020.

(30) Foreign Application Priority Data

Nov. 8, 2019    (KR) .................. 10-2019-0142233

(51) Int. Cl.
*H01Q 1/22*    (2006.01)
*G06F 3/041*    (2006.01)
(Continued)

(52) U.S. Cl.
CPC ............. *H01Q 1/52* (2013.01); *G06F 3/0412* (2013.01); *H01Q 1/38* (2013.01); *H04M 1/0266* (2013.01); *H04M 2201/38* (2013.01)

(58) Field of Classification Search
CPC   H01Q 1/52; H01Q 1/38; H01Q 1/243; H01Q 1/44; H01Q 21/065; H01Q 1/22;
(Continued)

(56) References Cited

U.S. PATENT DOCUMENTS

2015/0309636 A1* 10/2015 Kurasawa ............. G06F 3/0446
                                                              345/173
2017/0139520 A1*  5/2017 Yeh .......................... H01Q 9/30
(Continued)

FOREIGN PATENT DOCUMENTS

KR    10-2003-0095557 A    12/2003
KR    10-2012-0036658 A    4/2012
(Continued)

OTHER PUBLICATIONS

International Search Report for PCT/KR2020/015483 mailed on Feb. 22, 2021.
(Continued)

*Primary Examiner* — David E Lotter
(74) *Attorney, Agent, or Firm* — The PL Law Group, PLLC

(57) ABSTRACT

An antenna module according to an embodiment of the present invention includes a plurality of first sensing electrode rows, a plurality of second sensing electrode columns spaced apart from the first sensing electrode rows, an insulating interlayer formed between the first sensing electrode rows and the second sensing electrode columns, and an antenna unit inserted in at least one second sensing electrode column of the second sensing electrode columns to be electrically and physically separated from the second sensing electrode columns. The antenna unit does not overlap the first sensing electrode rows in a planar view.

18 Claims, 8 Drawing Sheets

(51) Int. Cl.
*H01Q 1/38* (2006.01)
*H01Q 1/52* (2006.01)
*H04M 1/02* (2006.01)

(58) Field of Classification Search
CPC .................... H01Q 1/12; G06F 3/0412; G06F 2203/04112; G06F 3/0445; G06F 3/0446; G06F 3/0448; G06F 2203/04103; G06F 3/041; H04M 1/0266; H04M 2201/38; H04M 1/026

See application file for complete search history.

(56) References Cited

U.S. PATENT DOCUMENTS

2018/0314369 A1    11/2018    Yashiro et al.
2019/0181539 A1*    6/2019    Lee ........................ H01Q 1/243

FOREIGN PATENT DOCUMENTS

| KR | 10-2017-0096866 A | 8/2017 |
| KR | 10-1940798 B1 | 1/2019 |
| WO | WO 2013/063176 A1 | 5/2013 |

OTHER PUBLICATIONS

Office action issued on Aug. 26, 2020 from Korean Patent Office in a counterpart Korean Patent Application No. 10-2019-0142233 (all the cited references are listed in this IDS.) (English translation is also submitted herewith.).

* cited by examiner

ANTENNA MODULE AND DISPLAY DEVICE INCLUDING THE SAME

CROSS REFERENCE TO RELATED APPLICATIONS AND CLAIM OF PRIORITY

The present application is a continuation application to International Application No. PCT/KR2020/015483 with an International Filing Date of Nov. 6, 2020, which claims the benefit of Korean Patent Application 10-2019-0142233 filed on Nov. 8, 2019 at the Korean Intellectual Property Office, the disclosures of which are incorporated by reference herein in their entirety.

BACKGROUND

1. Field

The present invention relates to an antenna module and a display device including the same. More particularly, the present invention relates to an antenna module including an antenna unit and a touch sensor layer, and a display device including the same.

2. Description of the Related Art

As information technologies have been developed, a wireless communication technology such as Wi-Fi, Bluetooth, etc., is combined with a display device in, e.g., a smartphone form. In this case, an antenna may be combined with the display device to provide a communication function.

As mobile communication technologies have been rapidly developed, an antenna capable of operating a high or ultra-high frequency communication is needed in the display device.

Further, electronic devices capable of implementing image display and information input functions are being developed by combining a display device with a touch sensor or a touch panel in which a user's direction can be input by selecting an instruction displayed on a screen with a human hand or an object. For example, as disclosed in Korean Patent Published Application No. 2014-0092366, touch screen panels in which a touch sensor is coupled to various image display devices has been recently developed.

When the touch sensor and the antenna are included in one image display device, an additional space for embedding the antenna is needed. Thus, a construction of a recent display device with a thin-layered and compact design may be limited. Further, a mutual signal interruption between the antenna and a touch sensing electrode may occur to degrade operational reliability.

For example, Korean Patent Published Application No. 2003-0095557 discloses an antenna embedded in a mobile terminal, but fails to consider a compatibility with other electric devices such as the touch sensor.

SUMMARY

According to an aspect of the present invention, there is provided an antenna module having improved spatial efficiency and operational reliability.

According to an aspect of the present invention, there is provided a display device including an antenna module having improved spatial efficiency and operational reliability.

(1) An antenna module, including: a plurality of first sensing electrode rows; a plurality of second sensing electrode columns spaced apart from the first sensing electrode rows; an insulating interlayer formed between the first sensing electrode rows and the second sensing electrode columns; and an antenna unit inserted in at least one second sensing electrode column of the second sensing electrode columns to be electrically and physically separated from the second sensing electrode columns, wherein the antenna unit does not overlap the first sensing electrode rows in a planar view.

(2) The antenna module according to the above (1), wherein at least one first sensing electrode row of the first sensing electrode rows includes a first antenna space therein, and the at least one second sensing electrode column includes a second antenna space therein.

(3) The antenna module according to the above (2), wherein the first sensing electrode rows and the second sensing electrode columns are arranged so that the first antenna space and the second antenna space overlap each other.

(4) The antenna module according to the above (2), wherein the antenna unit is inserted in the second antenna space to overlie the first antenna space in the planar view.

(5) The antenna module according to the above (4), wherein the insulating interlayer fills the first antenna space.

(6) The antenna module according to the above (4), wherein the second sensing electrode column includes a plurality of the second antenna spaces.

(7) The antenna module according to the above (6), further including a dummy antenna pattern inserted into a second antenna space in which the antenna unit is not inserted among the plurality of the second antenna spaces.

(8) The antenna module according to the above (7), wherein the antenna unit and the dummy antenna pattern includes a mesh structure.

(9) The antenna module according to the above (2), wherein the antenna unit includes a radiator and a transmission line extending from the radiator.

(10) The antenna module according to the above (9), wherein the radiator is inserted in the second antenna space, and the transmission line protrudes to an outside of the second antenna space.

(11) The antenna module according to the above (10), wherein an end portion of the at least one second sensing electrode column includes a second cut region through which the transmission line extends.

(12) The antenna module according to the above (11), wherein the at least one first sensing electrode row includes a first cut region formed at a region where the transmission line crosses in the planar view.

(13) The antenna module according to the above (9), further including a signal pad connected to an end portion of the transmission line.

(14) The antenna module according to the above (13), further including a ground pad disposed around the signal pad to be separated from the transmission line and the signal pad.

(15) The antenna module according to the above (1) wherein the antenna unit is inserted into each of both ends of the at least one second sensing electrode column.

(16) An antenna module, including: a plurality of first sensing electrode rows; a plurality of second sensing electrode columns disposed at the same level as that of the first sensing electrode rows to be electrically and physically separated from the first sensing electrode rows; and an antenna unit inserted in at least one second sensing electrode column of the second sensing electrode columns to be electrically and physically separated from the second sensing electrode columns, wherein the antenna unit does not overlap the first sensing electrode rows in a planar view.

(17) The antenna module according to the above (16), further including: bridge electrodes electrically connecting portions of the first sensing electrode rows spaced apart from each other with the second sensing electrode columns interposed therebetween; and an insulating interlayer disposed between the bridge electrodes and the second sensing electrode columns.

(18) A display device including the antenna module according to embodiments as described above.

According to embodiments of the present invention, an antenna unit may be disposed in a space included in a sensing electrode row or a sensing electrode column of a touch sensor electrode layer. Accordingly, a touch sensor and an antenna may be integrated into one module without additional stacking.

The antenna unit may not overlap the touch sensor electrode layer to prevent a mutual interference between the antenna unit and sensing electrodes, and a capacitance disturbance due to a parasitic capacitance.

In some embodiments, the antenna unit may include a mesh structure, and a dummy antenna may be disposed in a touch sensing area so that an electrode pattern structure may become uniform. Accordingly, an electrode visibility due to variations in an electrode pattern arrangement may be prevented.

DETAILED DESCRIPTION OF THE EMBODIMENTS

According to exemplary embodiments of the present invention, there is provided an antenna module structure including a sensing electrode row and a sensing electrode column and including an antenna unit disposed in the sensing electrode row and the sensing electrode column. The antenna module may be a touch sensor-antenna structure combined or integrated with a touch sensor.

Further, a display device including the antenna module with improved spatial efficiency and operational reliability is also provided.

The terms such as "first", "second", "upper", "lower", "row" and "column" used herein are not to designate an absolute position or direction, but used to refer to relative position and direction and different elements.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
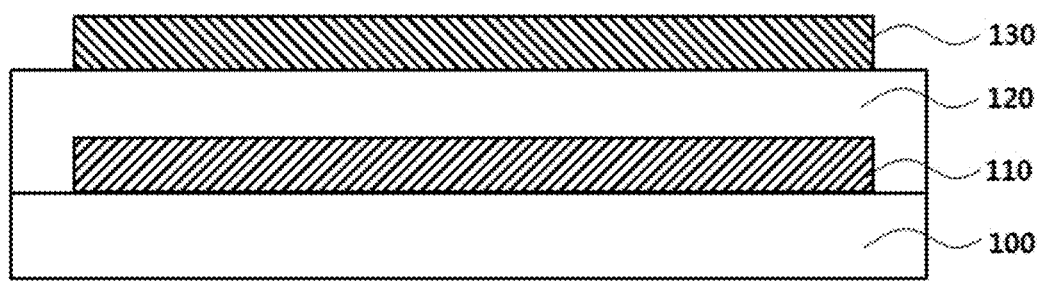
FIG. 1 is a schematic cross-sectional view illustrating an antenna module in accordance with exemplary embodiments.

FIG. 1 is a schematic cross-sectional view illustrating an antenna module in accordance with exemplary embodiments.

Referring to FIG. 1, antenna module may include a substrate layer 100, a first electrode layer 110, an insulating interlayer 120 and a second electrode layer 130.

The substrate layer 100 may broadly include a film-type substrate used as a base layer for forming the first and second electrode layers 110 and 130 or an object on which the first and second electrode layers 110 and 130 are formed. In some embodiments, the substrate layer 100 may refer to a display panel on which the first electrode layer 110 is directly formed.

For example, the substrate layer 100 may include a film material commonly used for a touch sensor, and may include, for e.g., glass, a polymer and/or an inorganic insulating material. Examples of the polymer may include cyclic olefin polymer (COP), polyethylene terephthalate (PET), polyacrylate (PAR), polyetherimide (PEI), polyethylene naphthalate (PEN), polyphenylene sulfide (PPS), polyallylate, polyimide (PI), cellulose acetate propionate (CAP), polyethersulfone (PES), cellulose triacetate (TAC), polycarbonate (PC), cyclic olefin copolymer (COC), polymethyl methacrylate (PMMA), etc. Examples of the inorganic insulating material may include silicon oxide, silicon nitride, silicon oxynitride, a metal oxide, etc.

In some embodiments, a layer or film member of the display device into which the antenna module is inserted may serve as the substrate layer 100. For example, an encapsulation layer or a passivation layer included in a display panel may serve as the substrate layer 100.

The first electrode layer 110 may include sensing electrode rows including first sensing electrodes. The second electrode layer 130 may include sensing electrode columns including second sensing electrodes.

The insulating interlayer 120 may be disposed between the first electrode layer 110 and the second electrode layer 130 to insulate the first and second sensing electrodes and generate a mutual capacitance.

For example, the insulating interlayer 120 may be formed on the substrate layer 100 to cover the first electrode layer 110. The second electrode layer 130 may be formed on the insulating interlayer 120.

The first and second electrode layers 110 and 130 may include silver (Ag), gold (Au), copper (Cu), aluminum (Al), platinum (Pt), Palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), molybdenum (Mo), calcium (Ca) or an alloy containing at least one of the metals. These may be used alone or in a combination of two or more thereof.

In one embodiment, the first and second electrode layers 110 and 130 may include silver (Ag) or silver alloy (e.g., silver-palladium-copper (APC)), or copper (Cu) or copper alloy (e.g., copper-calcium (CuCa)) for low-resistance implementation and fine line width patterning.

The first and second electrode layers 110 and 130 may include a transparent conductive oxide such as indium tin oxide (ITO), indium zinc oxide (IZO), zinc oxide (ZnO), indium zinc tin oxide (IZTO), cadmium tin oxide (CTO), or the like.

In some embodiments, the first and second electrode layers 110 and 130 may include a stacked structure of a transparent conductive oxide layer and a metal layer. For example, the first and second electrode layers 110 and 130 may have a double-layered structure of a transparent conductive oxide layer-metal layer, or a triple-layered structure of a transparent conductive oxide layer-metal layer-transparent conductive oxide layer. In this case, a flexible property and a signal transmission speed may be improved by the metal layer, while a corrosion resistance and a transparency may be improved by the transparent conductive oxide layer.

The insulating interlayer 120 may include an inorganic insulating material such as silicon oxide, silicon nitride or the like, and/or an organic insulating material such as an acrylic resin, a siloxane-based resin, or the like.

Figure 2:
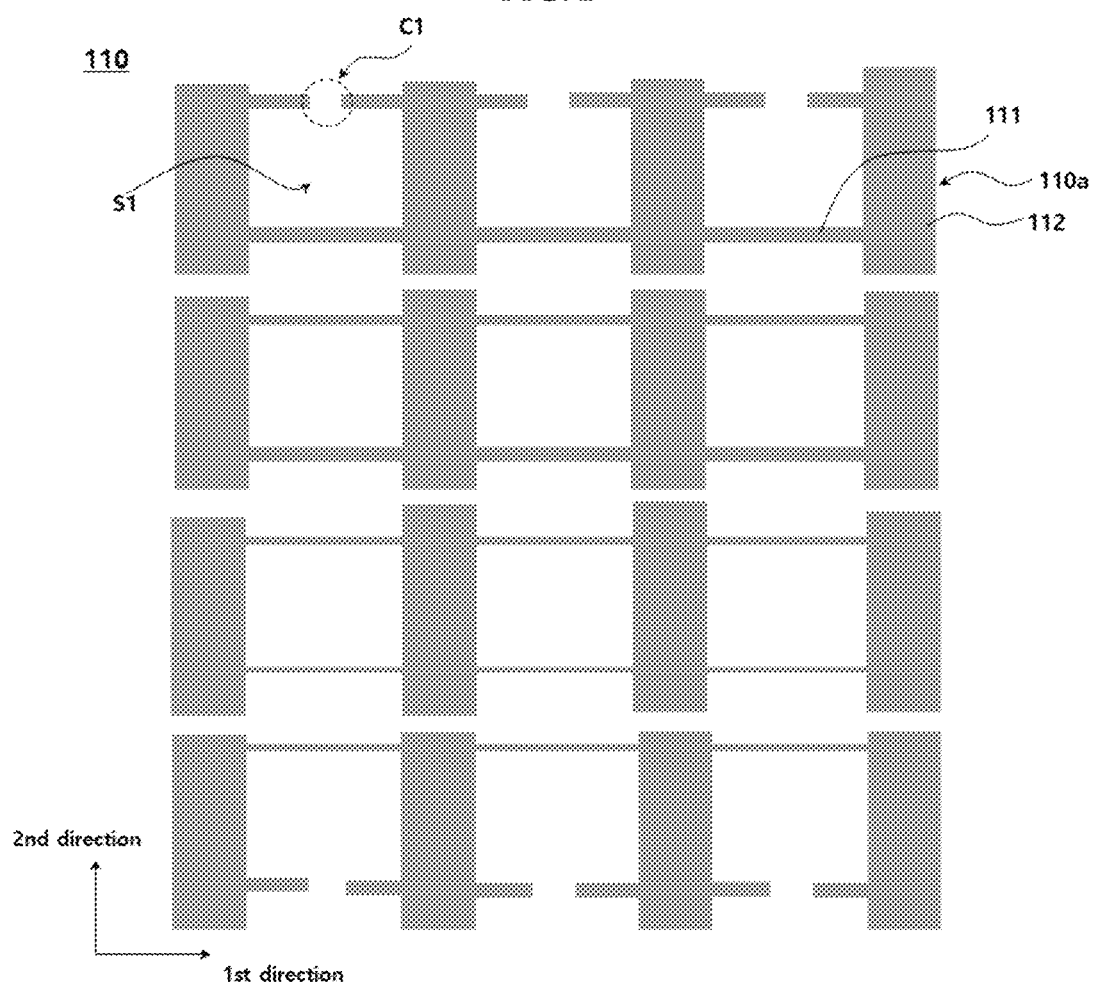
FIGS. 2 to 4 are schematic top planar views illustrating a stack construction of an antenna module in accordance with exemplary embodiments.
Figure 3:
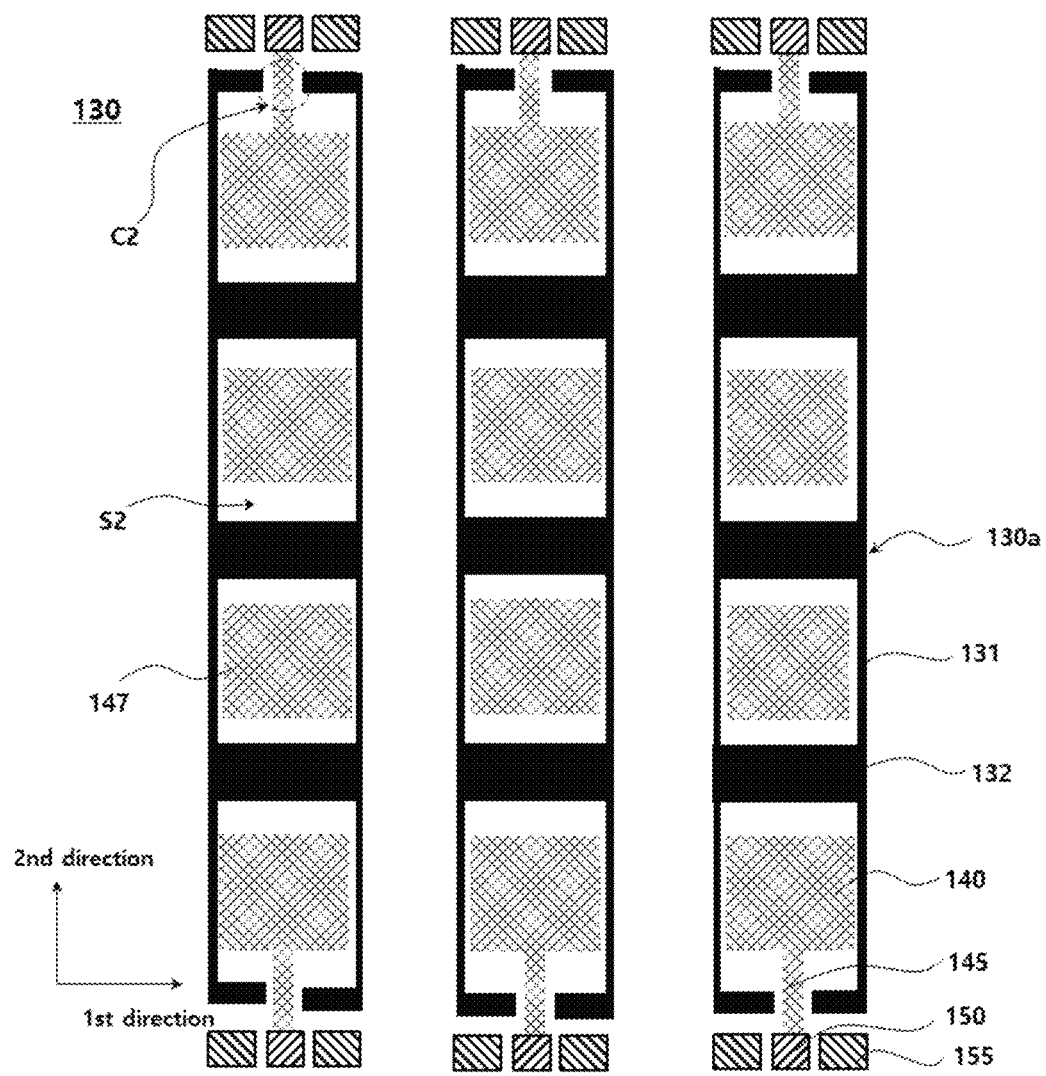
Figure 4:
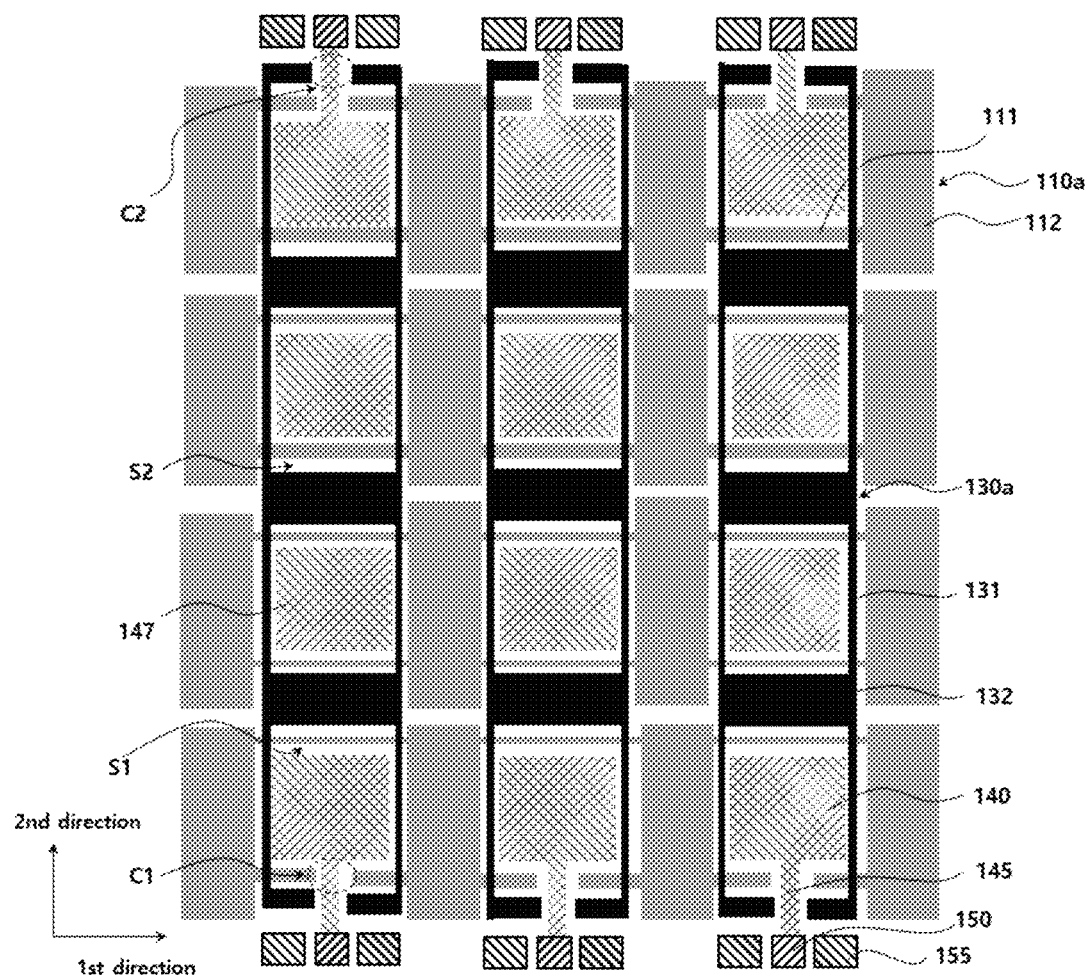

FIGS. 2 to 4 are schematic top planar views illustrating a stack construction of an antenna module in accordance with exemplary embodiments. Specifically, FIG. 2 illustrates an electrode pattern structure of the first electrode layer 110. FIG. 3 illustrates an electrode pattern structure of the second electrode layer 130. FIG. 4 is a planar view superimposing FIGS. 2 and 3 together.

For convenience of descriptions, an illustration of the substrate layer 100 and the insulating interlayer 120 is omitted in FIGS. 2 to 4. In FIGS. 2 to 4, two directions that are parallel to a top surface of the substrate layer 100 to cross each other are defined as a first direction and a second direction. For example, the first direction and the second direction may be perpendicular to each other.

Referring to FIG. 2, the first electrode layer 110 may include a plurality of first sensing electrode rows 110*a*.

In exemplary embodiments, a plurality of first sensing electrodes 112 may be arranged along the first direction. The first sensing electrodes 112 may be connected to each other by a first connecting portion 111. For example, the first connecting portion 111 may extend in the first direction and may be integrally connected to the plurality of the first sensing electrodes 112.

Accordingly, the first sensing electrode row 110*a* extending in the first direction may be defined. A plurality of the first sensing electrode rows 110*a* may be arranged along the second direction.

In some embodiments, one first sensing electrode row 110*a* may include two first connecting portions 111. For example, upper portions and lower portions of the first sensing electrodes 112 may be connected to each other by the first connecting portions 111.

At least one first antenna space S1 may be formed in the first sensing electrode row 110*a*. The first antenna space S1 may be defined between adjacent first sensing electrodes 112 and first connecting portions 111 facing each other. The first antenna space S1 may be a vacancy formed through the first sensing electrode row 110*a*.

In some embodiments, a plurality of the first antenna spaces S1 may be repeatedly arranged in the first sensing electrode row 110*a* along the first direction. The insulating interlayer 120 illustrated in FIG. 1 may cover the first electrode layer 110 and fill the first antenna spaces S1.

A portion of the first connecting portion 111 that may cross a transmission line 145 of an antenna unit as will be described later may be removed to form a first cut region C1. For example, the first cut regions C1 may be formed in the first connecting portions 111 formed at both ends of the first electrode layer 110.

Referring to FIG. 3, the second electrode layer 130 may include a plurality of second sensing electrode columns 130*a*.

In exemplary embodiments, a plurality of second sensing electrodes 132 may be arranged along the second direction. The second sensing electrodes 132 may be connected to each other by the second connecting portion 131. For example, the second connecting 131 may extend in the second direction and may be integrally connected to a plurality of the second sensing electrodes 132.

Accordingly, a second sensing electrode column 130*a* extending in the second direction may be defined. A plurality of the second sensing electrode columns 130*a* may be arranged along the first direction.

In some embodiments, one second sensing electrode column 130*a* may include two second connecting portions 131. For example, both lateral portions of the second sensing electrodes 132 may be connected to each other by the second connecting portions 131.

At least one second antenna space S2 may be formed in the second sensing electrode column 130*a*. The second antenna space S2 may be defined between the second sensing electrodes 132 and the second connecting portions 131 neighboring and facing each other. The second antenna space S2 may be a vacancy formed through the second sensing electrode column 130*a*.

In some embodiments, a plurality of the second antenna spaces S2 may be repeatedly arranged in the second sensing electrode column 130*a* along the second direction.

A portion of the second sensing electrode 132 that crosses the transmission line 145 of the antenna unit may be removed to form a second cut region C2. For example, the second cut regions C2 may be formed at the second sensing electrodes 132 disposed at one end or both ends of the second sensing electrode column 130*a*.

The antenna unit may include a radiation electrode 140 and the transmission line 145. In exemplary embodiments, the antenna unit may be disposed in the second antenna space S2.

In some embodiments, the radiator 140 may be accommodated in the second antenna space S2. The transmission line 145 may be partially inserted into the second antenna space S2. In this case, the transmission line 145 may protrude from the second antenna space S2 to an outside of the second antenna space S2 through the second cut region C2.

The radiator 140 may have, e.g., a polygonal plate shape and the transmission line 145 may branch and extend from one side of the radiator 140. The radiator 140 and the transmission line 145 may be formed as a substantially integral and unitary member.

The signal pad 150 may be connected to an end of the transmission line 145 that may protrude through the second cut region C2. For example, an antenna driving integrated circuit (IC) chip may be electrically connected to the signal pad 150 to perform a feeding through the transmission line 145.

The signal pad 150 and the antenna driving IC chip may be electrically connected to each other through a circuit connection structure such as, e.g., a flexible printed circuit board (FPCB) and/or an anisotropic conductive film (ACF).

The antenna unit may be inserted into the second antenna space S2 formed at an end portion of the second sensing electrode column 130*a*. In an embodiment, the antenna units may each be inserted into the second antenna spaces S2 formed at both end portions of the second sensing electrode column 130*a*.

In some embodiments, a dummy antenna pattern 147 may be inserted into the second antenna space S2 in which the antenna unit is not accommodated among the plurality of the second antenna spaces S2. The antenna unit and the dummy antenna pattern 147 may be electrically and physically separated from the second sensing electrode column 130*a*, and the dummy antenna pattern 147 may be provided as a floating electrode inserted in the second antenna space S2.

The dummy antenna patterns 147 may be distributed in the remaining second antenna spaces S2, so that a pattern uniformity on a front face of the antenna module may be improved. Accordingly, an electrode visibility due to variations in an electrode structure may be reduced or suppressed.

In some embodiments, the antenna unit and the dummy antenna pattern 147 may have a mesh structure including the aforementioned metal, alloy and/or transparent conductive oxide. Accordingly, a transmittance of the antenna module may be improved, and the electrode visibility may be more effectively prevented.

In an embodiment, the first sensing electrode row 110*a* and the second sensing electrode column 130*a* may also have a mesh structure including the aforementioned metal, alloy, and/or transparent conductive oxide.

The signal pad 150 may be a solid pattern including the above-described metal or alloy to reduce a feeding supply resistance and improve a signal transmission speed. In some embodiments, a ground pad 155 may be disposed around the signal pad 150.

For example, a pair of the ground pads 155 may be disposed to face each other while being spaced apart from the signal pad 150 and the transmission line 145 with the signal pad 150 interposed therebetween.

Referring to FIG. 4, the second electrode layer 130 may be stacked on the first electrode layer 110 such that the first and second antenna spaces S1 and S2 may be aligned to overlap each other. The antenna units may be arranged to be disposed in the first antenna space S1 included in the first sensing electrode row 110*a* in a planar view.

For example, the radiator 140 may be commonly accommodated in the first and second antenna spaces S1 and S2. The transmission line 145 may pass commonly through the first and second cut regions C1 and C2.

Accordingly, when being projected or observed in the planar view, the antenna unit may not overlap both the first sensing electrode row 110*a* and the second sensing electrode column 130*a*. Accordingly, a radiation through the radiator 140 and the feeding through the transmission line 145 may be performed without interfering with a touch sensing operation of the first sensing electrode row 110*a* and the second sensing electrode column 130*a*.

Therefore, desired directivity and gain property of the antenna unit may be achieved, so that radiation reliability may be improved. Additionally, desired sensing sensitivity and sensing resolution may be implemented while a generation of a capacitance and a channel current flow for the touch sensing may not be interfered by the antenna unit.

Figure 5:
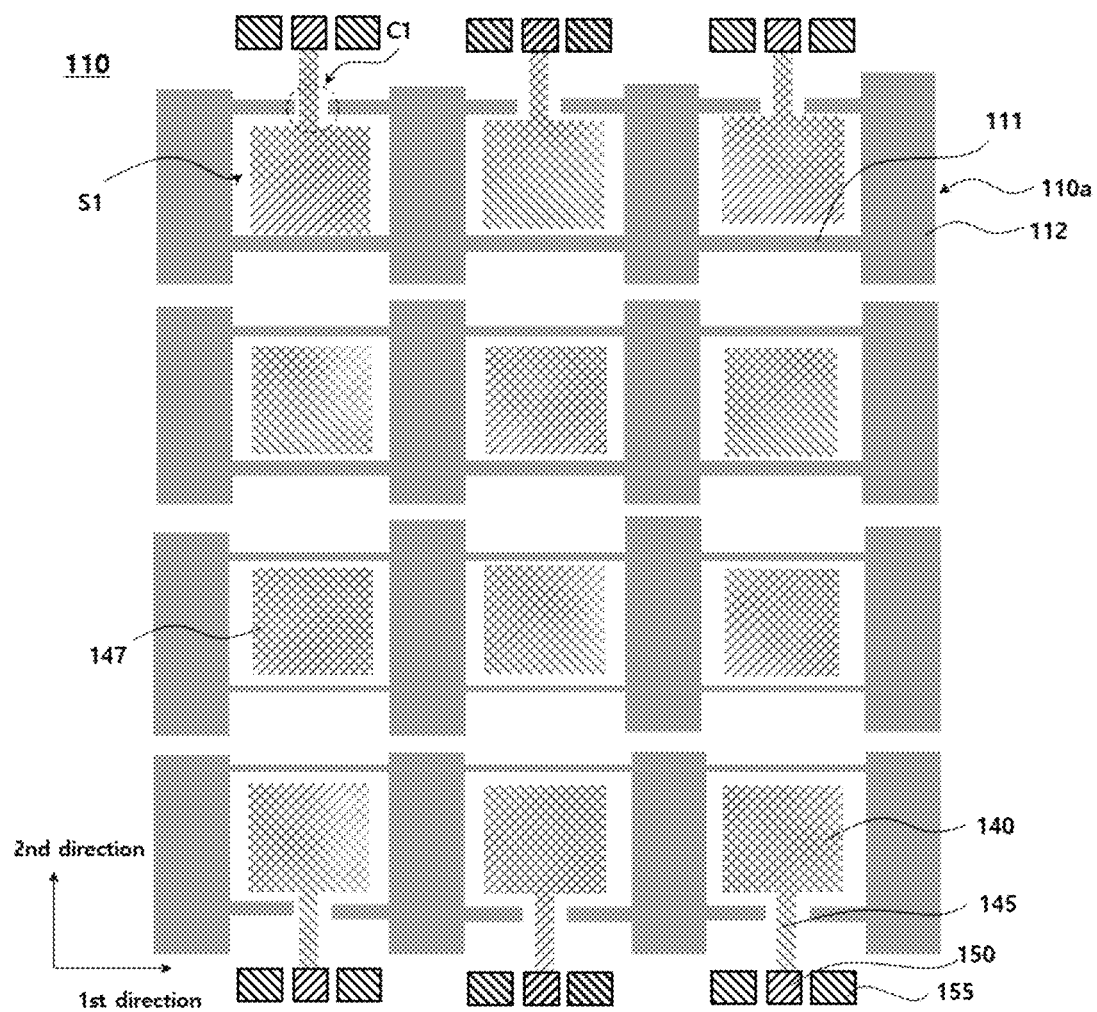
FIGS. 5 and 6 are schematic top planar views illustrating a stack construction of an antenna module in accordance with some exemplary embodiments.
Figure 6:
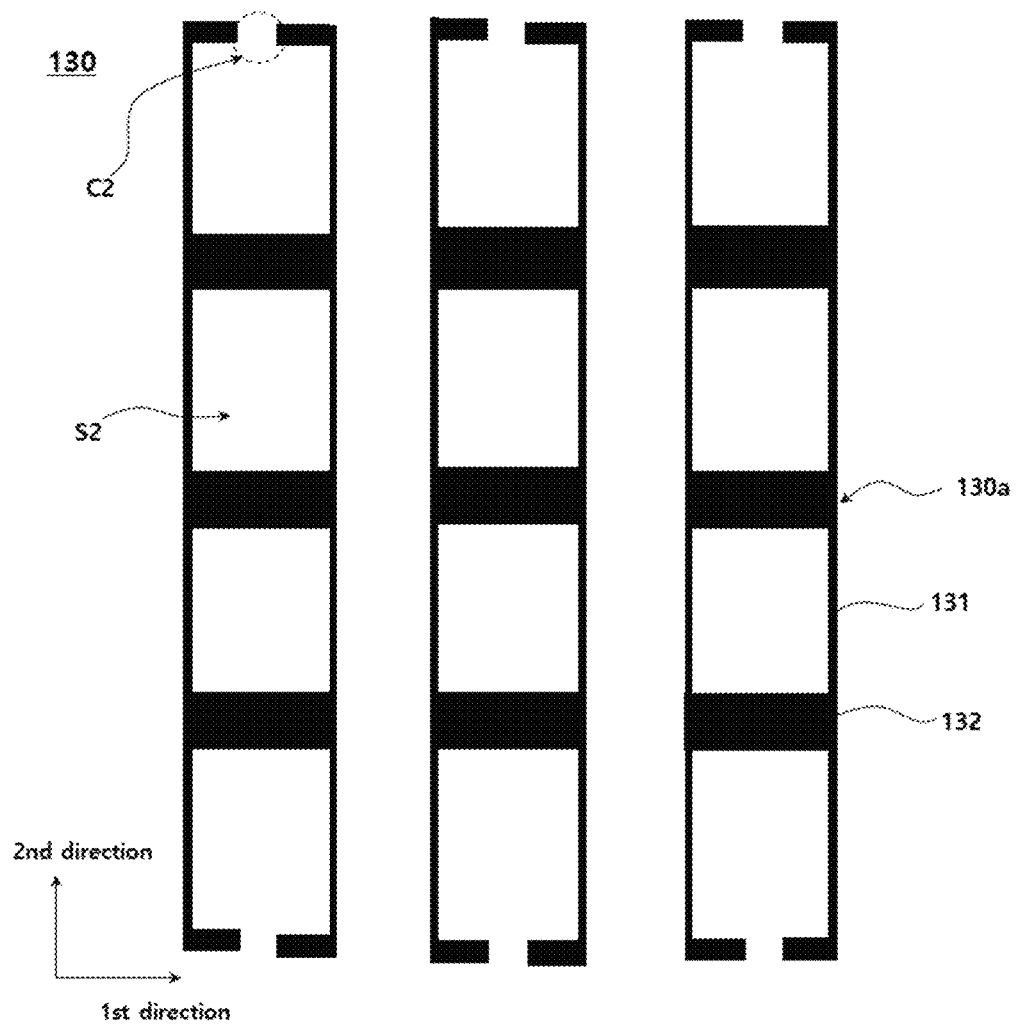

FIGS. 5 and 6 are schematic top planar views illustrating a stack construction of an antenna module in accordance with some exemplary embodiments.

Referring to FIGS. 5 and 6, the antenna unit including the radiator 140 and the transmission line 145 may be included in the first electrode layer 110.

In this case, the antenna unit may be inserted in the first antenna space S1 formed in the first sensing electrode row 110*a*. The dummy antenna pattern 147 may be disposed in the first antenna space S1 in which the antenna unit is not inserted among a plurality of the first antenna spaces S1.

When the second electrode layer 130 illustrated in FIG. 6 is stacked on the first electrode layer 110 illustrated FIG. 5, the antenna module having substantially the same structure as that of FIG. 4 may be obtained.

In some embodiments, the first sensing electrode row 110*a* or the second sensing electrode column 110*b* in which the antenna unit is not inserted may extend as a substantially continuous solid sensing line shape without including the antenna spaces S1 and S2 therein.

Figure 7:
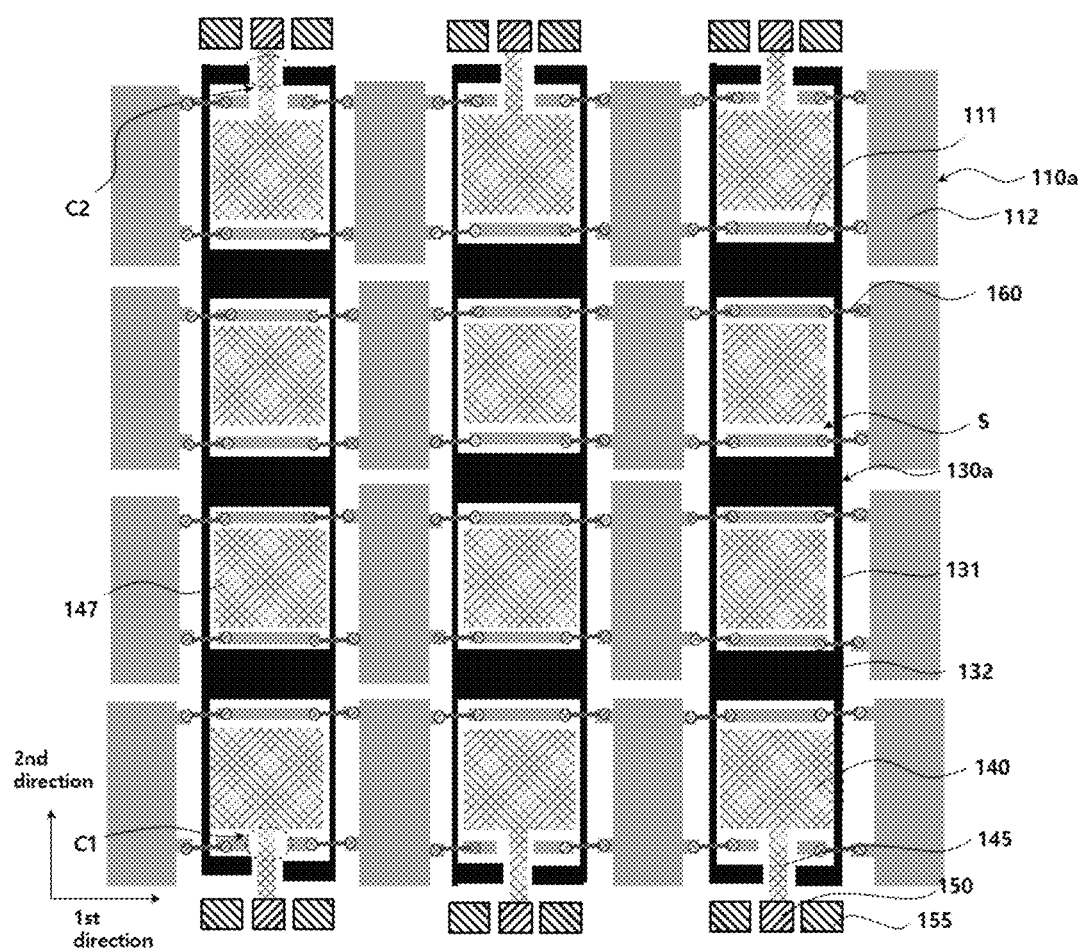
FIG. 7 is a schematic top planar view illustrating an antenna module in accordance with some exemplary embodiments.

FIG. 7 is a schematic top planar view illustrating an antenna module in accordance with some exemplary embodiments. Detailed descriptions on structures and elements substantially the same as or similar to those described with reference to FIGS. 1 to 4 are omitted herein.

Referring to FIG. 7, the first sensing electrode row 110*a*, the second sensing electrode column 130*a* and the antenna unit may be all located at the same layer or at the same level (e.g., on the top surface of the substrate layer 100).

For example, the second connecting portion 131 included in the second sensing electrode column 130*a* may cross the first connecting portion 111 included in the first sensing electrode row 110*a*. In this case, the first connecting portion 111 may be cut or spaced apart with the second connecting portion 131 interposed therebetween.

In exemplary embodiments, the first connecting portion 111 separated with the second connecting portion 131 interposed therebetween may be electrically connected to each other via a bridge electrode 160.

For example, the insulating interlayer 120 covering the first sensing electrode row 110*a*, the second sensing electrode column 130*a* and the antenna unit may be formed, and the bridge electrode 160 may be formed on the insulating interlayer 120. The bridge electrode 160 may connect the separated first connecting portions 111 to each other through contacts penetrating the insulating interlayer 120.

As described above, the antenna unit may include the radiator 140 and the transmission line 145. The antenna unit may be located on the same plane as that of the first sensing electrode row 110*a* and the second sensing electrode column 130*a*, and may be electrically and physically separated from the first sensing electrode row 110*a* and the second sensing electrode column 130*a*.

In exemplary embodiments, an antenna space S may be formed as an empty space in the second sensing electrode column 130*a*, and the radiator 140 may be disposed in the antenna space S.

In some embodiments, the bridge electrodes 160 may be formed on a top surface of the substrate layer 100, and the insulating interlayer 120 may be formed on the top surface of the substrate layer 100 to cover the bridge electrodes 160. The first sensing electrode row 110*a*, the second sensing electrode column 130*a* and the antenna units may be formed on the insulating interlayer 120. The first connecting portions 111 included in the first sensing electrode row 110*a* and separated from each other may be connected to each other through the bridge electrode 160 including a contact formed through the insulating interlayer 120.

Figure 8:
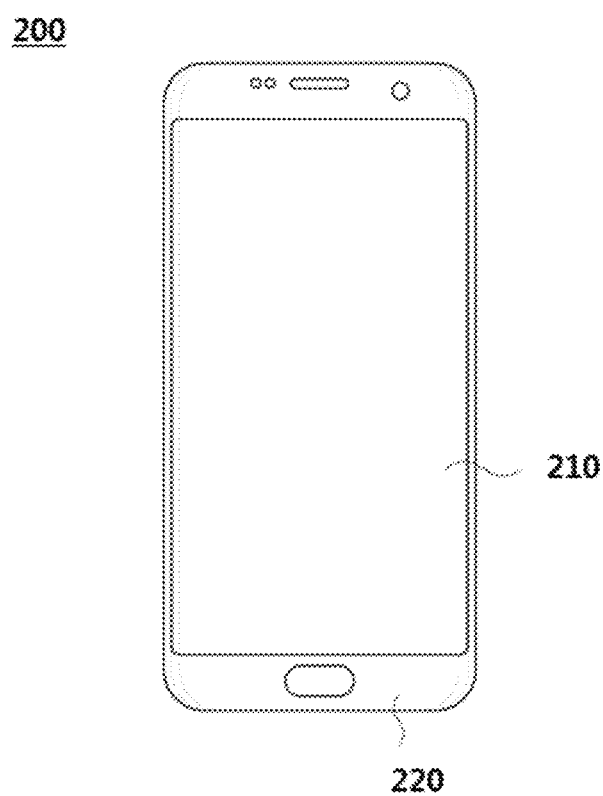
FIG. 8 is a schematic top planar view illustrating a display device in accordance with exemplary embodiments.

FIG. 8 is a schematic top planar view illustrating a display device in accordance with exemplary embodiments. For example, FIG. 8 illustrates an outer shape including a window of a display device.

Referring to FIG. 8, a display device 200 may include a display area 210 and a peripheral area 220. For example, the peripheral area 220 may be disposed on both end portions and/or both lateral portions of the display area 210. The peripheral area 220 may correspond to, e.g., a light-shielding portion or a bezel portion of an image display device.

The above-described antenna module may be disposed throughout the display area 210 and the peripheral area 220 of the display device 200. The radiator 140 of the antenna unit may also be arranged in the display area 210. As described above, the radiators 140 may be formed of the mesh structure to prevent from being visually recognized by a user. The dummy antenna patterns 147 may be distributed in the display area 210.

The transmission line 145 may extend to the peripheral area 220 through the cut regions C1 and C2, and the signal pad 150 may be connected to the transmission line 145 in the peripheral region 220.

A touch sensor driving IC chip and an antenna driving IC chip may be disposed together in the peripheral area 220. For example, a trace may extend from each of the first sensing electrode row and the second sensing electrode column to be electrically connected to the touch sensor driving IC chip. The antenna driving IC chip may be electrically connected to the antenna unit through the signal pad 150.

According to the above-described exemplary embodiments, a degree of spatial freedom of the display device may be increased by integrating the antenna unit of the antenna module with the first sensing electrode row or the second sensing electrode column at the same level.

Additionally, the antenna unit may be spaced apart from the first sensing electrode row or the second sensing electrode column to implement a touch sensing and an antenna driving with improved mutual independence and reliability in the display device 200.

What is claimed is:

1. An antenna module, comprising:
   a plurality of first sensing electrode rows;
   a plurality of second sensing electrode columns spaced apart from the first sensing electrode rows;
   an insulating interlayer formed between the first sensing electrode rows and the second sensing electrode columns; and
   an antenna unit inserted in at least one second sensing electrode column of the second sensing electrode columns to be electrically and physically separated from the second sensing electrode columns, wherein the antenna unit does not overlap the first sensing electrode rows in a planar view,
   wherein at least one first sensing electrode row of the first sensing electrode rows includes a first antenna space therein, and the at least one second sensing electrode column includes a second antenna space therein.

2. The antenna module according to claim 1, wherein the first sensing electrode rows and the second sensing electrode columns are arranged so that the first antenna space and the second antenna space overlap each other.

3. The antenna module according to claim 1, wherein the antenna unit is inserted in the second antenna space to overlie the first antenna space in the planar view.

4. The antenna module according to claim 3, wherein the insulating interlayer fills the first antenna space.

5. The antenna module according to claim 3, wherein the second sensing electrode column includes a plurality of the second antenna spaces.

6. The antenna module according to claim 5, further comprising a dummy antenna pattern inserted into a second antenna space in which the antenna unit is not inserted among the plurality of the second antenna spaces.

7. The antenna module according to claim 6, wherein the antenna unit and the dummy antenna pattern includes a mesh structure.

8. The antenna module according to claim 1, wherein the antenna unit comprises a radiator and a transmission line extending from the radiator.

9. The antenna module according to claim 8, wherein the radiator is inserted in the second antenna space, and the transmission line protrudes to an outside of the second antenna space.

10. The antenna module according to claim 9, wherein an end portion of the at least one second sensing electrode column includes a second cut region through which the transmission line extends.

11. The antenna module according to claim 10, wherein the at least one first sensing electrode row includes a first cut region formed at a region where the transmission line crosses in the planar view.

12. The antenna module according to claim 8, further comprising a signal pad connected to an end portion of the transmission line.

13. The antenna module according to claim 12, further comprising a ground pad disposed around the signal pad to be separated from the transmission line and the signal pad.

14. The antenna module according to claim 1, wherein the antenna unit is inserted into each of both ends of the at least one second sensing electrode column.

15. An antenna module, comprising:
   a plurality of first sensing electrode rows;
   a plurality of second sensing electrode columns disposed at the same level as that of the first sensing electrode rows to be electrically and physically separated from the first sensing electrode rows; and
   an antenna unit inserted in at least one second sensing electrode column of the second sensing electrode columns to be electrically and physically separated from the second sensing electrode columns, wherein the antenna unit does not overlap the first sensing electrode rows in a planar view,
   wherein at least one first sensing electrode row of the first sensing electrode rows includes a first antenna space therein, and the at least one second sensing electrode column includes a second antenna space therein.

16. The antenna module according to claim 15, further comprising:
   bridge electrodes electrically connecting portions of the first sensing electrode rows spaced apart from each other with the second sensing electrode columns interposed therebetween; and
   an insulating interlayer disposed between the bridge electrodes and the second sensing electrode columns.

17. A display device comprising the antenna module of claim 15.

18. A display device comprising the antenna module of claim 1.

* * * * *